United States Patent
Steinsträter et al.

(10) Patent No.: US 8,499,926 B2
(45) Date of Patent: Aug. 6, 2013

(54) CHAIN LINK MODULE FOR ACCUMULATING CHAIN

(75) Inventors: Dieter Steinsträter, Neuenkirchen (DE); Carsten Seib, Nordhorn (DE)

(73) Assignee: Ammeraal Beltech Modular A/S, Vejle (DK)

( * ) Notice: Subject to any disclaimer, the term of this patent is extended or adjusted under 35 U.S.C. 154(b) by 196 days.

(21) Appl. No.: 12/383,946

(22) Filed: Mar. 30, 2009

(65) Prior Publication Data

US 2009/0250320 A1      Oct. 8, 2009

(30) Foreign Application Priority Data

Mar. 28, 2008   (DK) .................................. 2008 00458
Feb. 6, 2009    (DK) .................................. 2009 00188

(51) Int. Cl.
    *B65G 17/06*          (2006.01)
(52) U.S. Cl.
    CPC ..................................... *B65G 17/06* (2013.01)
    USPC ............ 198/850; 198/851; 198/853; 198/779
(58) Field of Classification Search
    USPC .................................. 198/779, 850, 851, 853
    See application file for complete search history.

(56) References Cited

U.S. PATENT DOCUMENTS

| | | | | |
|---|---|---|---|---|
| 1,852,942 A | * | 4/1932 | Streine | 198/779 |
| 2,762,496 A | * | 9/1956 | McCaul | 198/779 |
| 3,690,433 A | * | 9/1972 | Buldini | 198/345.3 |
| 3,701,413 A | * | 10/1972 | Leahy et al. | 198/779 |
| 4,015,484 A | * | 4/1977 | Taylor | 474/167 |
| 4,518,077 A | * | 5/1985 | Ronco et al. | 198/731 |
| 4,821,869 A | * | 4/1989 | Hodlewsky | 198/779 |
| 4,880,107 A | * | 11/1989 | Deal | 198/779 |
| 4,909,380 A | * | 3/1990 | Hodlewsky | 198/779 |
| 5,040,667 A | * | 8/1991 | Kamita | 198/779 |
| 5,096,050 A | * | 3/1992 | Hodlewsky | 198/779 |
| 5,261,525 A | * | 11/1993 | Garbagnati | 198/779 |
| 5,549,194 A | * | 8/1996 | Dag | 198/845 |
| 6,029,802 A | * | 2/2000 | Musiari et al. | 198/852 |
| 6,398,015 B1 | * | 6/2002 | Sedlacek et al. | 198/779 |

(Continued)

FOREIGN PATENT DOCUMENTS

| | | |
|---|---|---|
| EP | 1655243 | 5/2006 |
| JP | 02/175507 | 7/1990 |
| NL | 1010530 | 7/2000 |
| WO | WO 01/83338 | 11/2001 |

*Primary Examiner* — Gene Crawford
*Assistant Examiner* — William R Harp
(74) *Attorney, Agent, or Firm* — James Creighton Wray

(57) ABSTRACT

Modular belt module of the type having a width, and a length, where the width and length defines a plane, and a thickness orthogonal to said plane, such that the basic module is limited by two longitudinal sides, and a front and rear side, where the module along front and rear sides is provided with eye parts, spaced by openings, such that an eye part on one edge fits inside an opening between two eye parts on an adjacent module, whereby apertures provided in the eye parts parallel to the front and rear sides overlap and may accommodate a hinge pin, characterized in that adjacent and parallel to the two longitudinal sides, upstanding flanges are provided, where each flange is provided with means for accommodating an axle, arranged parallel to the front and rear sides.

15 Claims, 5 Drawing Sheets

(56) References Cited

U.S. PATENT DOCUMENTS

| | | | |
|---|---|---|---|
| 6,443,293 B2 * | 9/2002 | Patrito | 198/465.1 |
| 7,073,659 B1 * | 7/2006 | Lucchi | 198/779 |
| 7,234,587 B2 * | 6/2007 | Fandella | 198/779 |
| 7,578,384 B2 * | 8/2009 | Fandella | 198/844.1 |
| 7,757,838 B2 * | 7/2010 | Fandella | 198/779 |
| 2003/0010608 A1 * | 1/2003 | Jaynes | 198/860.1 |
| 2006/0096841 A1 * | 5/2006 | Wieting et al. | 198/779 |
| 2007/0039805 A1 * | 2/2007 | Fandella | 198/779 |

\* cited by examiner

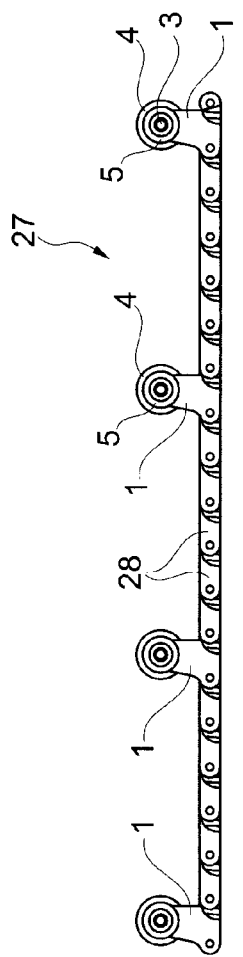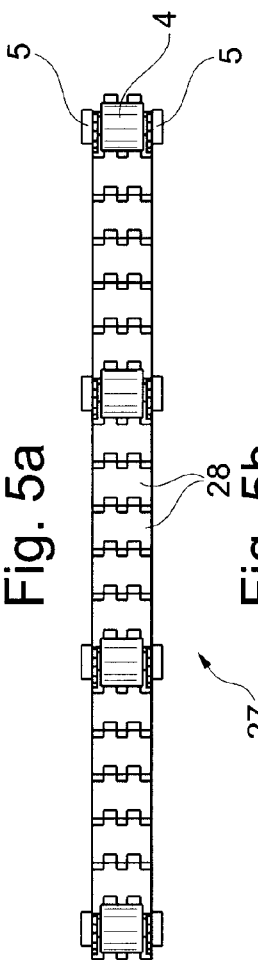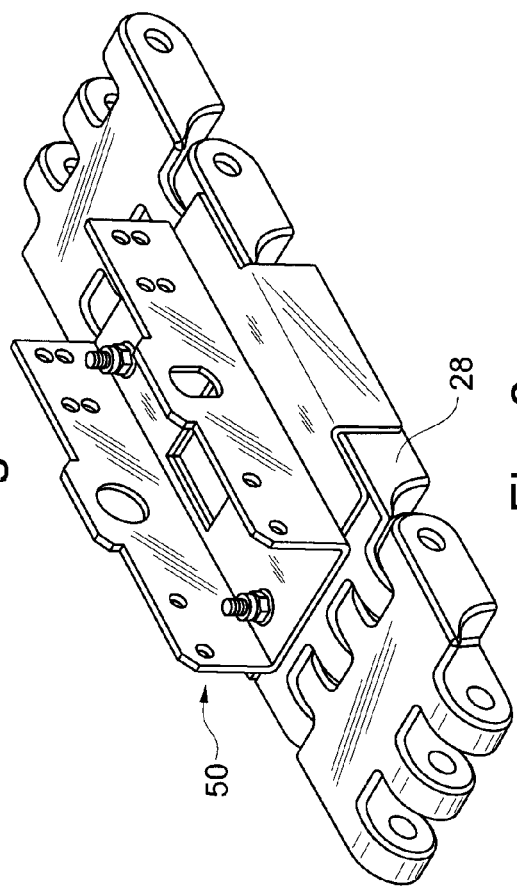

CHAIN LINK MODULE FOR ACCUMULATING CHAIN

This application claims the benefit of Danish Application No. PA 2008 00458 filed Mar. 28, 2008 and Danish Application No. PA 2009 00188 filed Feb. 6, 2009, which are hereby incorporated by reference in their entirety.

FIELD OF THE INVENTION

The present invention relates to a modular belt module as well as a skid buffer system incorporating a belt module according to the invention.

BACKGROUND OF THE INVENTION

When assembling relatively large structures such as automobiles and the like it is common to use skids as a carrying structure for the automobile during its assembly. The skid is transported along rails on the factory floor such that a worker may work on the automobile while the automobile is being transported to or through the particular work station. At the end of the transport system a build-up of skids may occur in situations where the following process steps are slower or falling behind the production cycle of the previous assembly line. Therefore a number of skids will accommodate in this area and the skid buffer system must be able to accumulate skids and keep trans-porting other skids further behind on the line.

For this purpose a skid buffer system is usually provided with members supporting the skids on the conveyor line where the support means incorporate rollers such that when the skid is halted either by a stop or by a another skid in front of it the conveyor belt will be able to maintain its rotation thereby accumulating the skids in a certain position. In the art there are a number of constructions where these conveyor belts comprising roller constructions are illustrated.

An example is illustrated in DE 102004009842 wherein a conveying chain is provided with an adaptor shoe fitted over and onto the chain links where the adaptor shoe comprises a roller such that by arranging the adaptor shoe at intermittent intervals along the conveyor chain a relatively high density of support rollers is provided for the skids which are to be placed on the conveyor belt.

Another installation is marketed by the company Fata Automation.

These systems all provide add-on rollers to either endless rubber belt conveyors or chain conveyors, i.e. conveyors made out of modular belt links.

In EP 1655243, NL 1010530 and WO01/83338 are illustrated conveyor belts where the upper side of the belts are provided with rollers. The rollers are integral with the belt links. A plurality of rollers are arranged laterally relative to the transport direction. These types of belts are used as accumulating belts, i.e. belts used for transporting a number of smaller products, which for one reason or the other will be accumulated on the belt. The rollers allow the belt to keep circulating even though the products are stationary.

OBJECT OF THE INVENTION

It is an object of the present invention to provide an improved skid accumulation system.

DESCRIPTION OF THE INVENTION

The present invention presents an integrated modular belt module of the type having a width, and a length, where the width and length defines a plane, and a thickness orthogonal to said plane, such that the basic module is limited by two longitudinal sides, and a front and rear side, where the module along front and rear sides is provided with eye parts, spaced by openings, such that an eye part on one edge fits inside an opening between two eye parts on an adjacent module, whereby apertures provided in the eye parts parallel to the front and rear sides overlap and may accommodate a hinge pin, characterised in that adjacent and parallel to the two longitudinal sides, upstanding flanges are provided, where each flange is provided with means for accommodating an axle, arranged parallel to the front and rear sides.

By providing an integrated belt module having the features of the other substantially identical belt links it is ensured that the conveyor as such will have the same characteristics relating to loading capability, turning radiuses, maintenance and so forth, and at the same time by providing the special modular belt modules according to the present invention, the known systems will be expanded by belt modules having means for accommodating an axle such that an integrated one-piece module may be integrated in the conveyor belt.

The invention furthermore provides for easy replacement in that the modular belt modules according to the invention may easily be replaced in the same manner as ordinary belt modules whereby downtime is drastically reduced. Furthermore, the wear characteristics of the belt module being made from the same material, e.g. injection moulded thermoplastic materials, will be exactly the same as the rest of the conveyor belt, and thus the regular, usual service and maintenance intervals may be maintained.

A further advantage is the fact that the modules carrying the rollers has the same dimensions as the rest of the chain. Therefore the support structure may be simpler in that the traditional prior art devices requires special guidance means since the roller sections are wider than the chain between rollers, whereby means for guiding the entire conveyor are necessary. This is not the case with the present invention due to the integrated nature of the modules, whereby all modules in the chain, has substantially identical dimensions relating to the support structure.

In a further advantageous embodiment of the invention reinforcing means are provided between the upstanding flanges and the plane, where the reinforcement is in the shape of ribs, either spanning between the flanges or only partly between the flanges.

In use the conveyor belt incorporating modular belt modules according to the present invention will incorporate an axle as will be explained below with reference to further advantageous embodiments which will provide load carrying rollers which will trans-fer the load of the skids placed on a central roller to a load absorbing structure also being the guiding structure for the conveyor belt.

In this manner the loads transferred to the conveyor belt as such are only minimal. However, by providing reinforcing means between the upstanding flanges a very stiff and relatively strong modular belt module is provided such that the modular belt modules according to the present invention will be at least as strong as ordinary belt modules whereby breakage, tear and wear will just as likely to occur in other parts of the conveyor belt as in connection with the belt modules according to the present invention. Obviously, the reinforcement means may be dimensioned for the specific purposes, but also standard modular belt modules incorporating flanges and reinforcement means may be produced such that for a host of applications, standard modules will be the preferred item.

In a further advantageous embodiment of the invention the module is injection moulded in a one-step moulding process. This makes it in relation to the prior art solutions a very cheap and maintenance free solution in that no separate parts are necessary, the module may be mounted in a modular fashion in the conveyor belt without requiring special tools, and the plastic due to the load transferral via the axle is only exposed to limited loads which may easily be absorbed by the relatively cheap injection moulded material. Furthermore, by being able to injection mould the modular belt module the weight of the module may be kept relatively low which is important in that for some of the production lines where belt modules of this type are incorporated, i.e. in the automobile assembly process, the conveyor belts are relatively long, and as such the conveyor construction's own weight often plays an important role in the attainable conveyor length. The heavier the conveyor belt modules, the larger the load is at a specific given length, and therefore, by being able to reduce the weight of the modules the entire conveyor will be lighter and thereby require less power or even be able to be built at a longer length with the same power.

In a further advantageous embodiment the means for accommodating an axle, where said axle between the upstanding flanges is provided with a first roller, and where smaller rollers are provided in either end of the axle, outside the sides of the flanges. This advantageous embodiment facilitates long life capabilities of the belt modules in that the interface between the rotating member and the fixed member, namely the accommodating means in the belt module are provided with friction reducing agents such that the interaction in the interface will be as little as possible. The friction reducing layer may be added for example by inserting and snapping or clicking into place a U-shaped nylon or Delarin® member i.e. a modified nylon in the means for accommodating the axle. Alternatively, the interface surfaces of the belt module may be coated for example by spray painting or the like with a Teflon layer, i.e. a friction reducing agent or layer 31 in order to reduce the friction.

In a still further advantageous embodiment of the invention an axle is arranged in the means for accommodating an axle, where said axle between the upstanding flanges is provided with a first roller, and where smaller rollers are provided in either end of the axle, outside the sides of the flanges. The axle is not a part of the belt module as such, but the axle accommodating means must be dimensioned in order to be able to accommodate the specific axle and the axle must have a strength such that the smaller rollers which are designed to be transferring the load from the skid placed on the central roller as already discussed above to the underlying carrying structure. In this manner the belt module needs only to be able to transfer forces in the longitudinal direction and these forces arise partly from the belt module or conveyor's friction against the carrying structure, and the first roller's rolling friction between a skid placed on the roller and the axle. As such the belt module will not be exposed to forces perpendicular to the travelling direction and in the travelling direction the rollers will reduce the impact from the loads put on the rollers.

In a still further advantageous embodiment of the invention the module comprises an axle, where said axle comprises a first inner carrying member, having five different sections:
 a first and second section arranged in either end of the axle which extend outside the flanges when the axle is mounted in the belt link, where said first and second sections have outer coaxially arranged bearings which are rotatable relative to the carrying member;
 third and fourth sections arranged inside from the first and second sections, where the third and fourth sections are dimensioned to engage the means for accommodating the axle, thereby preventing the carrying member from rotating;
 a fifth section arranged inside the third and fourth sections, where said fifth section has an outer coaxial bearing which is rotatable relative to the carrying member.

This embodiment is particularly advantageous in that the axle does not rotate in its interface with the belt module, but is just maintained in a fixed position and then has rotatable bearing members arranged on which the rollers mentioned above may be mounted such that during use the axle will not transfer any friction to the axle accommodating means of the belt module as such.

In a further advantageous embodiment the upstanding flanges are one or two separate flange elements, where the flange element(s) is/are mechanically fastened to the modular belt link, and where the flanges comprises means for accommodating the axle.

In this manner is achieved that the skid roller may be retrofitted to existing modular belt modules, not being "born" with these facilities. Depending on the size of the modules the flanges may be provided as two separate members fastened independently to the modular belt links, or as one unit having two spaced flanges attached to the modular belt link.

In a still further advantageous embodiment the flange element(s) are bolted onto two adjacent modular belt modules. In this manner a simple and easy assembly is provided. At the same time replacement of the flanges is fairly easy as the bots only needs to be removed in order to allow removal of the flanges.

By furthermore attaching the flange elements to two adjacent modular belt modules the load is spread such that larger loads may be applied with less impact on the modular belt conveyor.

The flange elements are preferably made from steel, in particular stainless steel, aluminium or other strong, stiff and preferably non-corroding material.

In a further embodiment the flange element(s) in addition to the upstanding flanges also comprises secondary flanges adapted to be placed in contact with a side of the modular belt module, and that pins are provided on said secondary flanges, such that the pins on the flange element(s) may be inserted into the modular belt modules eye parts instead of the hinge pins.

Also in a further development the upstanding flanges is a separate U-shaped element, and the secondary flanges are separate elements, where assembly means are provided for assembling the U-shaped element with the secondary flanges.

By providing the flange element in more sub-elements it becomes easier to mount the arrangement on the modular belt conveyor. Also for repairs only the parts necessary needs to be replaced. It is also contemplated that parts exhibiting various strength characteristics may be assembled according to the task, such that "tailor-made" modules may provided.

The invention is also directed to a skid buffer system incorporating a belt module as explained above wherein the system comprises two substantially parallel guides, where at least one guide comprises an endless belt made up of modular belt modules where a number of the modular belt modules of the type having a width, and a length, where the width and length defines a plane, and a thickness orthogonal to said plane, such that the basic module is limited by two longitudinal sides, and a front and rear side, where the module along front and rear sides are provided with eye parts, spaced by openings, such that an eye part on one edge fits inside an opening between two eye parts on an adjacent module, whereby apertures provided in the eye parts parallel to the front and rear sides overlap and may accommodate a hinge pin, characterised in that adjacent and parallel to the two longitudinal sides, upstanding flanges are provided, where each flange is provided with means for accommodating an axle, arranged parallel to the front and rear sides where an axle is arranged in the means for accommodating an axle, where said axle between the upstanding flanges is provided with a first roller, and where smaller rollers are provided in either end of the axle, outside the sides of the flanges.

Such systems are widely used in the automobile assembly industry and by incorporating a belt module as disclosed above all the advantages already recited are transferred to the skid buffer system according to the present invention.

DESCRIPTION OF THE DRAWING

The invention will now be explained with reference to the accompanying drawings in which

FIGS. 5a and 5b illustrates a conveyor belt incorporating modules according to the invention.

FIG. 6 illustrates a modular belt link equipped with a flange element.

In FIG. 1 is illustrated a belt module comprising an injection moulded part 2 in which is mounted an axle 3. On the axle is mounted a first roller 4 as well as secondary load carrying rollers 5.

The injection moulded part 2 comprises eye parts 6 which are spaced in order to provide openings 7 such that the eye parts of another belt link may be inserted in the openings such that the apertures 8 provided in the eye parts may be superposed, and a hinge pin (not illustrated) may be inserted through the superposed apertures thereby creating a hinged connection between adjacent modules in order to build up a conveyor chain.

Figure 2A:
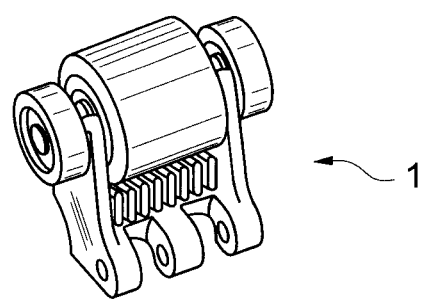
FIGS. 2a-2h illustrates different configurations of integrated reinforcement in the module construction.
Figure 2B:
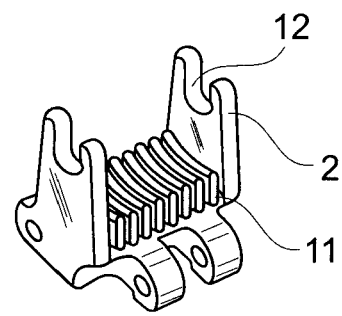
Figure 2C:
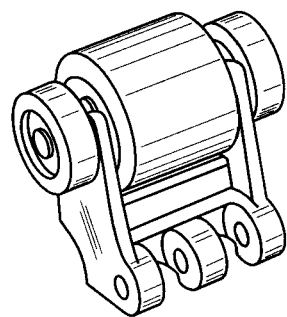
Figure 2D:
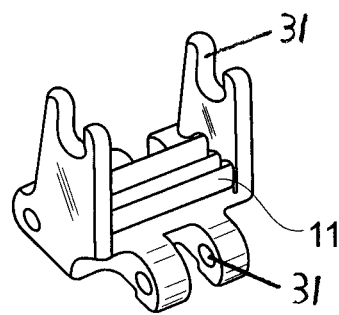
Figure 2E:
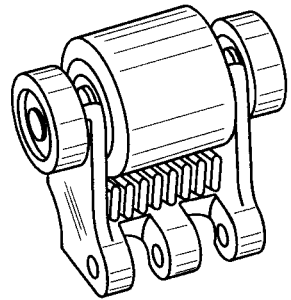

The injection moulded part is provided with two side flanges 9, 10 where each flange 9, 10 is provided with accommodating means, see FIG. 2b, in order to accommodate the axle 3.

In order to increase the strength and thereby also the rigidity, stability and wear properties of the module 1, the injection moulded part is moulded with integral reinforcement means 11 in the shape of ribs. In this embodiment the ribs are both provided crossing the belt link and in a longitudinal direction of the belt module such that the ribs make up a rib structure making the modular belt module extremely stiff.

Figure 1:
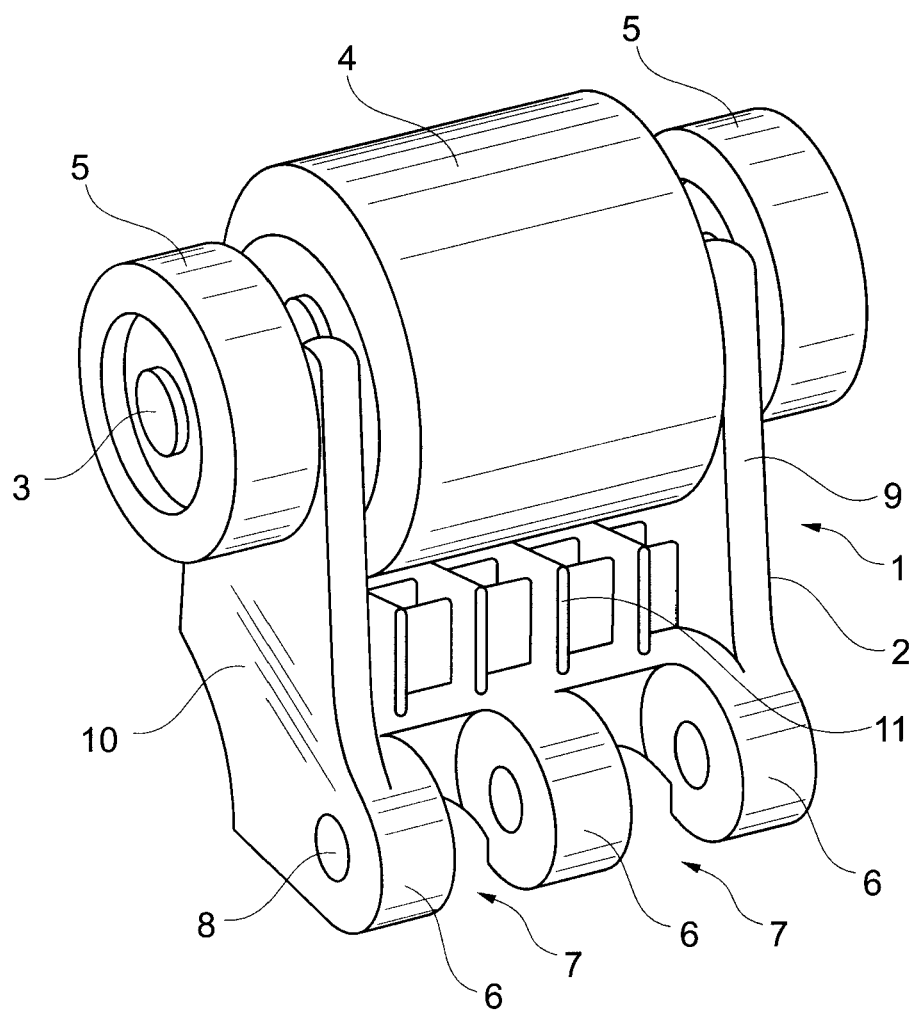
FIG. 1 illustrates a module according to the invention whereon is mounted carrying rollers.
Figure 2F:
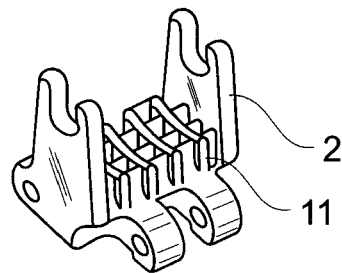
Figure 2G:
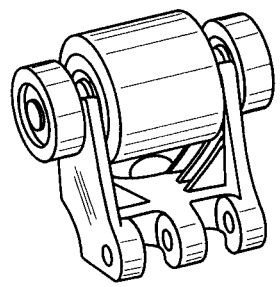
Figure 2H:
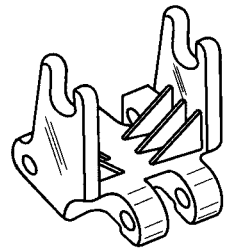

In FIGS. 2a-2h different variations of the reinforcement structure 11 is illustrated. FIG. 2f corresponds to the injection moulded part 2 illustrated with reference to FIG. 1.

In FIGS. 2b, 2d, 2f and 2h the accommodating means 12 for accommodating the axle 3 may be clearly seen. In this embodiment the accommodating means is not provided with a coating or an insert improving the wear capabilities between the axle and the injection moulded part 2 due to the fact that the accommodating means 12 having a U-shape is designed to accommodate an axle which will be further explained with reference to FIG. 3.

The various reinforcement arrangements 11 illustrated in FIGS. 2b, 2d, 2f and 2h are all designed in order to provide extra strength to the modular belt module, but their specific configuration may have any form and shape depending on the application and the illustrated reinforcement systems are only for illustrative purposes.

Figure 3:
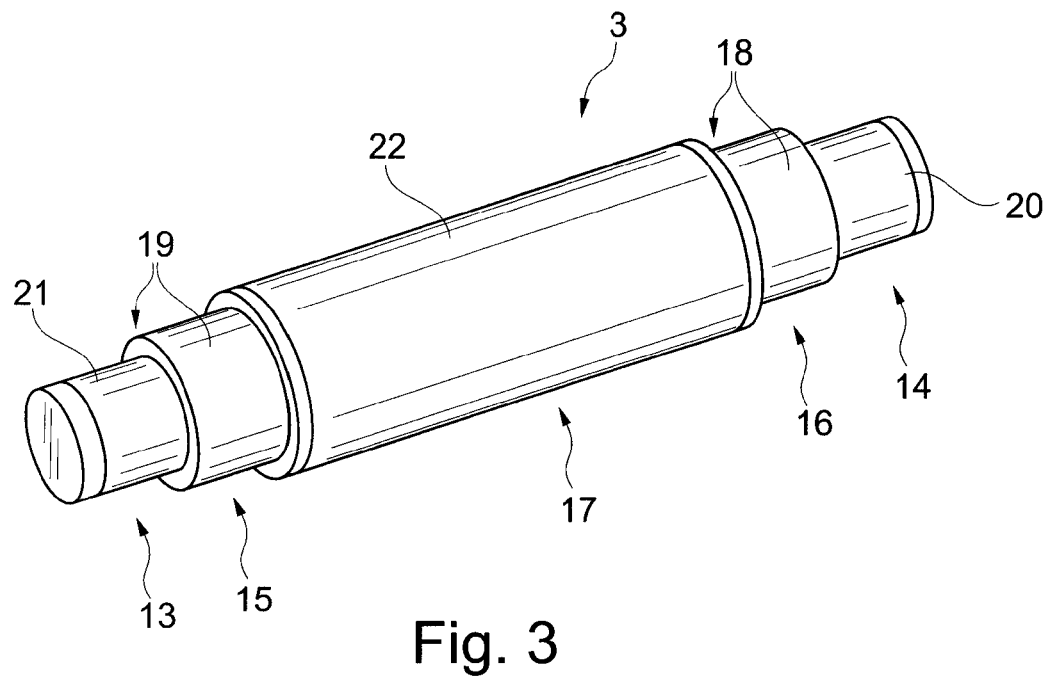
FIG. 3 illustrates an axel for use with a module.

Turning to FIG. 3 an axle suitable to be inserted into the accommodating means 12 (see FIG. 2b) is illustrated. The axle comprises five sections 13-17 where the sections 13 and 14 are identical to sections 15 and 16. The sections 15 and 16 are dimensioned such that the axle will fit inside the accommodating means 12 of the injection moulded part 2. The specific axle illustrated with reference to FIG. 3 is a non-rotating axle, and for this purpose the second sections 15, 16 are provided with non-round flat faces 18, 19 which will engage the inside of the outstanding flanges of the accommodating means 12. The first sections 13, 14 are provided with bearings 20, 21 which are coaxially arranged outside the axle as such such that the bearings 20, 21 may rotate relative to the second sections 18, 19. In the same manner the middle section 17 is provided with a coaxially arranged bearing 22 which again may rotate relative to the fixed second sections 15, 16. The sections 20, 21, 22 are adapted to receive the rollers 4, 5 such that the rollers will be engaging the bearings 20, 21, 22 and thereby create rotation without transferring any forces to the non-rotating parts 15, 16 of the axle and thereby no wear will occur between the flat faces 18, 19 and the corresponding accommodating means 12 in the injection moulded part 2.

Figure 4:
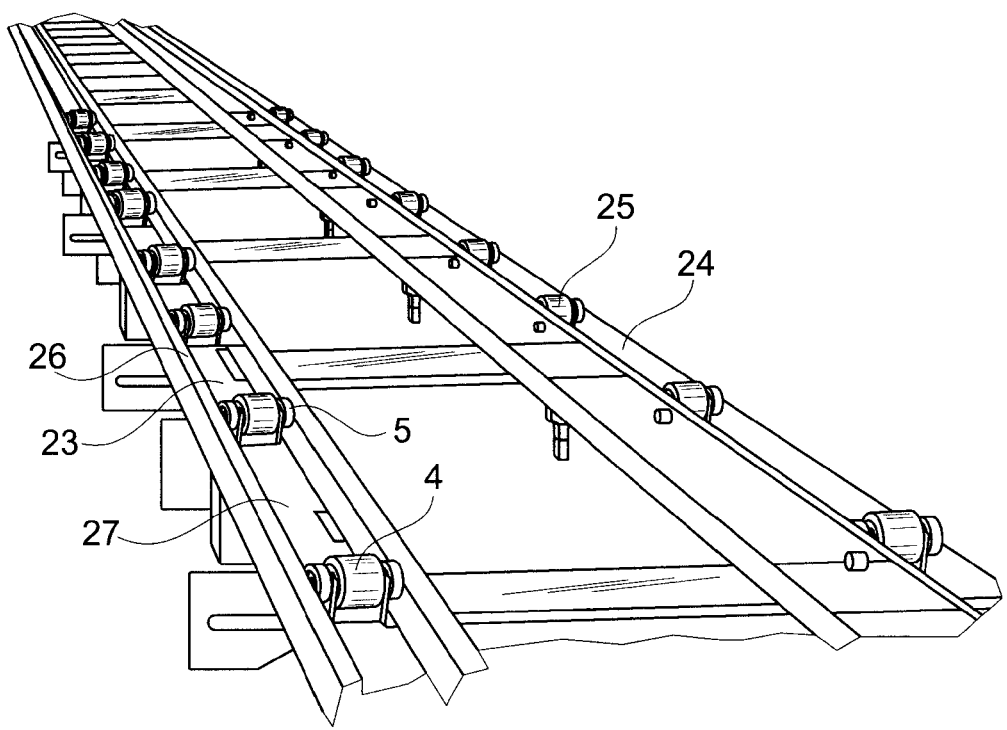
FIG. 4 illustrates a skid conveyor system.

Turning to FIG. 4 a typical skid buffer system is illustrated where the skid buffer system comprises two substantially parallel rails 23, 24 where one rail 24 is mounted with fixed rollers 25 whereas the other rail comprises a carrying structure 26 in which the first rollers 4, see FIG. 1, may transfer the load from the skids (not illustrated). The first rollers 4 are mounted on the same axle as the small rollers 5 and by their integration in the conveyor belt 27 rotation of the conveyor belt makes the rollers 5 roll along the carrying structure 26 transferring any load put on the large roller 4 via the axle to the small rollers 5 and thereby to the fixed construction 26.

In FIGS. 5a and 5b are illustrated a conveyor belt 27 made up from a plurality of standard chain modules 28, which are typically injection moulded plastic modules, for example available from uni-chains A/S; Denmark. At regular intervals integral modular belt modules 1 being supplied with axles 3, first rollers 4 and support rollers 5 are included in the endless conveyor belt 27. In this example five standard modules 28 are provided between each module 1 according to the invention, but obviously any number including zero of standard modules 28 may be arranged between the modules 1 of the invention.

Turning to FIG. 6 a flange element 50 is mounted on two chain modules 28. The flange element 50 in this embodiment is a one-piece element, but the flange element could also be made up of a right and a left side element.

Figure 7:
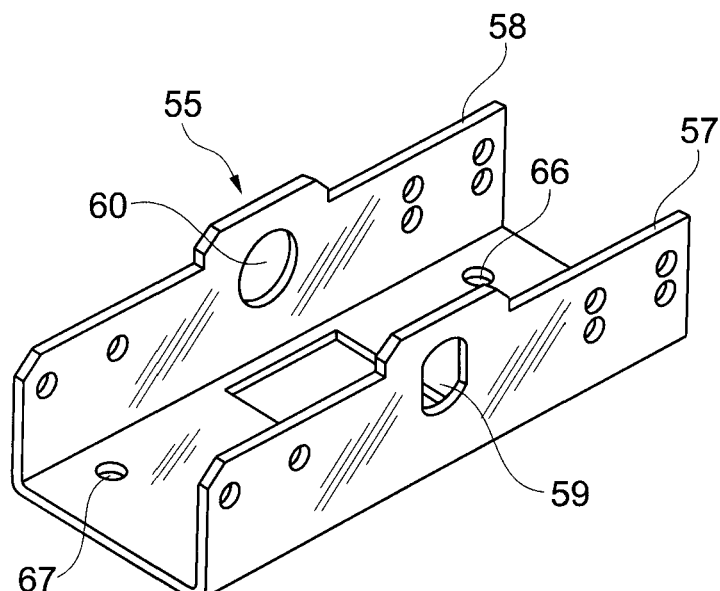
FIG. 7-9 illustrates a further embodiment of the flange element.
Figure 8:
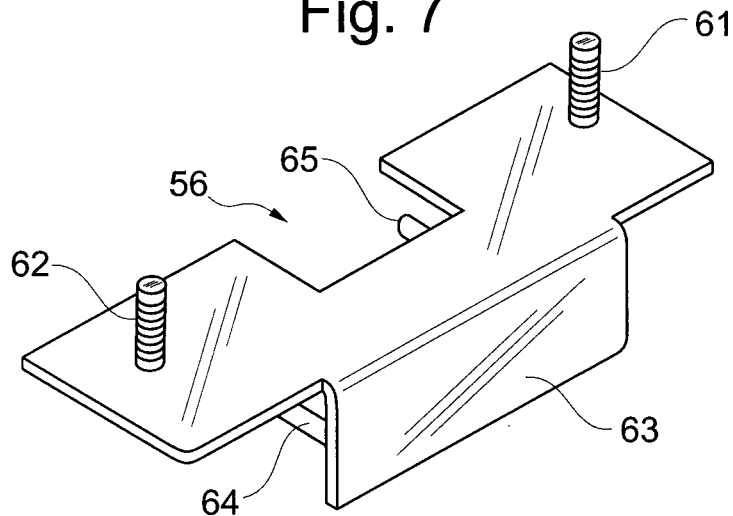

Turning to FIGS. 7 and 8 elements 55,56 for assembling a flange element are illustrated. The element 55 in FIG. 7 has a general U-shape with two upstanding flanges 57,58. In the flanges are provided apertures 59,60, suitable to accommodate an axle 3 (see for example FIG. 3).

The element 56 in FIG. 8, is provided with assembly means in the shape of upstanding threaded rods 61,62, as well as a secondary flange 63 suitable to be placed against a side surface of a modular belt module. Extending perpendicularly from the plane of the secondary flange 63 are two rods 64,65. The rods have a size and mutual distance such that the rods may be inserted in the apertures provided in the eyeparts in the modular belt modules in place of the hinge pin.

Figure 9:
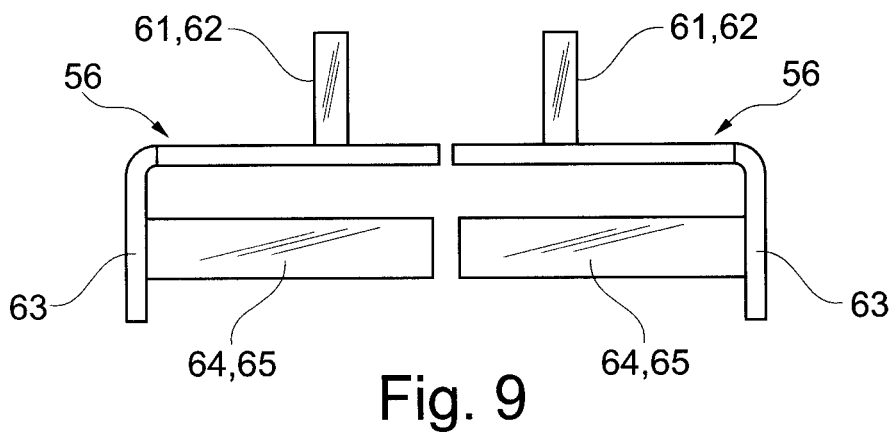

When the rods are inserted in the modular belt module, two elements 56 will be placed as illustrated in FIG. 9 (module not shown). The assembly means 61,62 are then placed such that apertures 66,67 in the U-shaped element (see FIG. 7) will accommodate the means 61,62. By fastening by placing nuts on the tread on the means 61,62 a modular belt module according to the invention is assembled.

The invention claimed is:

1. Modular plastic belt modules for a skid buffer system, each of the modular plastic belt modules having a width, and a length, where the width and the length define a plane, and having a thickness orthogonal to said plane, such that each module is limited by two longitudinal sides and a front and rear side, where each module along the front and rear sides is provided with plural eye parts, spaced by openings, such that an eye part on one edge fits inside an opening between two eye parts on an adjacent module, wherein said eye parts have apertures parallel to the front and rear sides-configured to accommodate hinge pins, wherein adjacent modules are connected by fitting eye parts on one module inside openings between two eye parts on an adjacent module and connecting the adjacent modules by inserting hinge pins laterally through overlapping apertures and wherein spaced in parallel lines of the modules connected by the hinge pins and wherein spaced modules in the lines of connected modules have upstanding flanges connected to and parallel to the two longitudinal sides, where each flange has an axle accommodation surface in the shape of either a U-shaped cradle or an aperture, and an axle in said axle accommodation surfaces said axle being arranged parallel to the front and rear sides in said accommodation surface and where said axle between the upstanding flanges is provided with a first larger inner roller, and where smaller outer rollers are provided in either end of the axle, outside the sides of the flanges, wherein the upstanding flanges are one or two separate flange elements, where each flange element is mechanically fastened to the modular belt module, and where each flange element comprises the accommodation surface for accommodating the axle.

2. Modular belt modules according to claim 1 wherein molded reinforcements are provided between the upstanding flanges and the plane, where the molded reinforcements are in the shape of ribs, either spanning between the flanges or only partly between the flanges.

3. Modular belt modules according to claim 1 wherein the modules are injection moulded in a one step moulding process.

4. Modular belt modules according to claim 1, where the axle accommodation surface in the shape of either a U-shaped cradle or an aperture is coated with a friction reducing agent or a friction reducing layer added to the accommodation surface, such that the axle is rotatably accommodated in the accommodation surface in the shape of either a U-shaped cradle or an aperture.

5. Modular belt modules according to claim 1, where each axle further comprises five different sections:

first and second sections arranged in either end of the axle which extend outside the flanges, where said first and second sections have outer coaxially arranged load carrying rollers on bearings which are rotatable relative to the axle;

third and fourth sections arranged inside from the first and second sections, where the third and fourth sections are dimensioned to engage the accommodation surfaces for accommodating the axle, thereby preventing the axle from rotating;

a fifth section arranged inside the third and fourth sections, where said fifth section has the first larger inner roller on a bearing which is rotatable relative to the axle.

6. Modular belt modules according to claim 1 wherein the upstanding flanges are one or two separate flange elements, where each flange element is mechanically fastened to the modular belt module, and where each flange element comprises the accommodation surface for accommodating the axle.

7. Modular belt modules of claim 1, wherein the U-shaped cradle or aperture has a flat, wherein the axle has a complementary flat, and wherein the flats cooperate and prevent the axle from rotating.

8. Modular belt modules of claim 1, wherein the first larger inner roller is a skid-contacting roller and the smaller outer rollers are load supporting rollers supporting the skid, the inner roller and the axle.

9. Modular belt modules of claim 8, wherein the modules are configured to pull the axles and rollers forward without supporting weight of the axles, rollers and skid.

10. Modular plastic belt modules for a skid buffer system, each of the modular plastic belt modules having a width, and a length, where the width and the length define a plane, and having a thickness orthogonal to said plane, such that each module is limited by two longitudinal sides and a front and rear side, where each module along the front and rear sides is provided with plural eye parts, spaced by openings, such that an eye part on one edge fits inside an opening between two eye parts on an adjacent module, wherein said eye parts have apertures parallel to the front and rear sides-configured to accommodate hinge pins, wherein adjacent modules are connected by fitting eye parts on one module inside openings between two eye parts on an adjacent module and connecting the adjacent modules by inserting hinge pins laterally through overlapping apertures and wherein spaced in parallel lines of the modules connected by the hinge pins and wherein spaced modules in the lines of connected modules have upstanding flanges connected to and parallel to the two longitudinal sides, where each flange has an axle accommodation surface in the shape of either a U-shaped cradle or an aperture, and an axle in said axle accommodation surfaces said axle being arranged parallel to the front and rear sides in said accommodation surface and where said axle between the upstanding flanges is provided with a first larger inner roller, and where smaller outer rollers are provided in either end of the axle, outside the sides of the flanges, wherein the upstanding flanges are one or two separate flange elements, where each flange element is mechanically fastened to the modular belt module, and where each flange element comprises the accommodation surface for accommodating the axle, wherein the flange elements are bolted onto two adjacent modular belt modules.

11. The skid buffer system of claim 8, wherein the U-shaped cradle or aperture has a flat, wherein the axle has a complementary flat, and wherein the flats cooperate and prevent the axle from rotating.

12. The skid buffer system of claim 10, wherein the first larger inner roller is a skid-contacting roller and the smaller outer rollers are load supporting rollers supporting the skid, the inner roller and the axle.

13. The skid buffer system of claim 10, wherein the modules are configured to pull the axles and rollers forward without supporting weight of the axles, rollers and skid.

14. Modular plastic belt modules for a skid buffer system, each of the modular plastic belt modules having a width, and a length, where the width and the length define a plane, and having a thickness orthogonal to said plane, such that each module is limited by two longitudinal sides and a front and rear side, where each module along the front and rear sides is provided with plural eye parts, spaced by openings, such that an eye part on one edge fits inside an opening between two eye parts on an adjacent module, wherein said eye parts have apertures parallel to the front and rear sides-configured to accommodate hinge pins, wherein adjacent modules are connected by fitting eye parts on one module inside openings between two eye parts on an adjacent module and connecting the adjacent modules by inserting hinge pins laterally through overlapping apertures and wherein spaced in parallel lines of the modules connected by the hinge pins and wherein spaced modules in the lines of connected modules have upstanding flanges connected to and parallel to the two longitudinal sides, where each flange has an axle accommodation surface in the shape of either a U-shaped cradle or an aperture, and an axle in said axle accommodation surfaces said axle being arranged parallel to the front and rear sides in said accommodation surface and where said axle between the upstanding flanges is provided with a first larger inner roller, and where smaller outer rollers are provided in either end of the axle, outside the sides of the flanges, wherein the upstanding flanges are one or two separate flange elements, where each flange element is mechanically fastened to the modular belt module, and where each flange element comprises the accommodation surface for accommodating the axle, wherein the flange elements in addition to the upstanding flanges further comprises secondary flanges adapted to be placed in contact with a side of the modular belt module, and that extended pins are provided on said secondary flanges, such that the extended pins on the flange elements are inserted into the modular belt modules eye parts instead of the hinge pins.

15. Modular belt modules according to claim 14, wherein the upstanding flanges are separate U-shaped elements, wherein the upstanding flanges and the secondary flanges are connected to the belt module with threaded members and nuts.

* * * * *